(12) United States Patent
Smyrniotis et al.

(10) Patent No.: US 9,399,597 B2
(45) Date of Patent: Jul. 26, 2016

(54) ASH COMPOSITIONS RECOVERED FROM COAL COMBUSTION GASES HAVING REDUCED EMISSIONS OF HCl AND/OR MERCURY

(71) Applicant: FUEL TECH, INC., Warrenville, IL (US)

(72) Inventors: Christopher R. Smyrniotis, St. Charles, IL (US); Kent W. Schulz, Geneva, IL (US); Emelito P. Rivera, Inverness, IL (US); Ian Saratovsky, Highland Park, IL (US); Vasudeo S. Gavaskar, Naperville, IL (US)

(73) Assignee: FUEL TECH, INC., Warrenville, IL (US)

( * ) Notice: Subject to any disclaimer, the term of this patent is extended or adjusted under 35 U.S.C. 154(b) by 0 days.

(21) Appl. No.: 14/468,978

(22) Filed: Aug. 26, 2014

(65) Prior Publication Data

US 2014/0360409 A1  Dec. 11, 2014

Related U.S. Application Data

(63) Continuation-in-part of application No. 13/854,361, filed on Apr. 1, 2013, now Pat. No. 8,916,120, and a continuation-in-part of application No. 14/190,451, filed on Feb. 26, 2014.

(51) Int. Cl.
*B01J 20/00* (2006.01)
*C04B 7/26* (2006.01)
(Continued)

(52) U.S. Cl.
CPC . *C04B 7/26* (2013.01); *B01D 53/64* (2013.01); *B01D 53/685* (2013.01); *B01J 20/043* (2013.01);
(Continued)

(58) Field of Classification Search
CPC ........ C04B 2/063; C04B 11/26; C04B 14/36; C04B 7/26; B01D 53/64
See application file for complete search history.

(56) References Cited

U.S. PATENT DOCUMENTS 2,965,438 A    12/1960  Mullen, Jr.
3,226,992 A     1/1966  Atsukawa et al.
(Continued)

FOREIGN PATENT DOCUMENTS

CN    102173610 A  *  9/2011  ............... C04B 7/26
CN    102649628 B  * 10/2014  ............. C04B 7/147
(Continued)

OTHER PUBLICATIONS

EPA-452/R-97-010; Dec. 1997; Mercury Study, Report 5 to Congress; vol. VII: An Evaluation of Mercury Control Technologies and Costs.
(Continued)

*Primary Examiner* — Timothy Vanoy
(74) *Attorney, Agent, or Firm* — Thaddius J. Carvis

(57) ABSTRACT

The description relates to production of fly ash with properties suitable for use in Portland cement. The fly ash compositions will contain coal ash, water-insoluble copper compositions and metallic mercury adsorbed onto ash particles. In one aspect, the coal ash composition will have a total mercury content of from 0.1 to 2.0 ppm and the water-soluble mercury is less than 20% of the total mercury content. The process entails combusting coal to produce hot combustion gases containing fly ash, $CO_2$, chlorine, and mercury, cooling the combustion gases and introducing into the combustion gases at a temperature of less than 1000° F., preferably within the range of from about 250° to about 900° F., a copper-based chloride remediator (CBCR), and collecting the fly ash which comprises insoluble copper compositions and water insoluble mercury compositions.

4 Claims, 1 Drawing Sheet

(51) Int. Cl.
*B01D 53/64* (2006.01)
*B01J 20/04* (2006.01)
*B01J 20/22* (2006.01)
*B01D 53/68* (2006.01)

(52) U.S. Cl.
CPC ......... *B01J 20/223* (2013.01); *B01D 2253/112* (2013.01); *B01D 2253/304* (2013.01); *B01D 2257/2045* (2013.01); *B01D 2257/602* (2013.01); *B01D 2258/0283* (2013.01)

(56) References Cited

U.S. PATENT DOCUMENTS

| | | | |
|---|---|---|---|
| 3,900,504 | A | 8/1975 | Woerner |
| 3,956,458 | A | 5/1976 | Anderson |
| 4,020,180 | A | 4/1977 | Woerner |
| 4,081,253 | A | 3/1978 | Marion |
| 4,500,327 | A | 2/1985 | Nishino et al. |
| 4,609,537 | A | 9/1986 | Tolpin et al. |
| 4,724,130 | A | 2/1988 | Statnick et al. |
| 4,731,233 | A | 3/1988 | Thompson et al. |
| 4,755,499 | A | 7/1988 | Neal et al. |
| 4,795,586 | A | 1/1989 | Thompson et al. |
| 4,923,688 | A | 5/1990 | Iannicelli |
| 5,114,898 | A | 5/1992 | Pinnavaia et al. |
| 5,492,685 | A | 2/1996 | Moran |
| 5,520,898 | A | 5/1996 | Pinnavaia et al. |
| 5,658,547 | A | 8/1997 | Michalak et al. |
| 5,740,745 | A | 4/1998 | Smyrniotis et al. |
| 5,894,806 | A | 4/1999 | Smyrniotis et al. |
| 5,897,688 | A | 4/1999 | Voogt et al. |
| 6,281,164 | B1 | 8/2001 | Demmel et al. |
| 6,453,830 | B1 | 9/2002 | Zauderer |
| 6,579,507 | B2 | 6/2003 | Pahlman et al. |
| 6,808,692 | B2 | 10/2004 | Oehr |
| 6,878,358 | B2 | 4/2005 | Vosteen et al. |
| 6,953,494 | B2 | 10/2005 | Nelson |
| 6,974,564 | B2 | 12/2005 | Biermann et al. |
| 7,435,286 | B2 | 10/2008 | Olson et al. |
| 7,666,374 | B2 | 2/2010 | Grochowski |
| 7,858,061 | B2 * | 12/2010 | Varma et al. ............... 423/215.5 |
| 2006/0210463 | A1 | 9/2006 | Comrie |
| 2008/0127631 | A1 | 6/2008 | Haitko et al. |
| 2009/0056538 | A1 | 3/2009 | Srinivasachar et al. |
| 2010/0059428 | A1 | 3/2010 | Boren |
| 2010/0282140 | A1 | 11/2010 | Matteson et al. |
| 2010/0317509 | A1 * | 12/2010 | Wang .............................. 502/62 |
| 2011/0045422 | A1 | 2/2011 | Tanca |
| 2011/0079143 | A1 | 4/2011 | Marotta et al. |
| 2011/0123422 | A1 * | 5/2011 | Wang ........................ 423/240 S |

FOREIGN PATENT DOCUMENTS

| | | | |
|---|---|---|---|
| WO | 9219365 | A1 | 11/1992 |
| WO | 0216026 | A2 | 2/2002 |
| WO | 2011143517 | A1 | 11/2011 |

OTHER PUBLICATIONS

Kettner, The Removal of Sulfur Dioxide from Flue Gases, Bulletin of the World Health Organization. 32: 421-429, 1965 {retrieved on Sep. 18, 2013}.Retrieved from the internet. <URL:http://whqlibdoc.who.int/bulletin/1965/Vol32/Vol32-No3/bulletin_1965_32%283%29_421-429.pdf>.

Srivastava, Ravi K., Controlling SO2 Emissions: A Review of Technologies: EPA/600/R-00/00933, Nov. 2000.

PCT Search Report, May 2014.

* cited by examiner

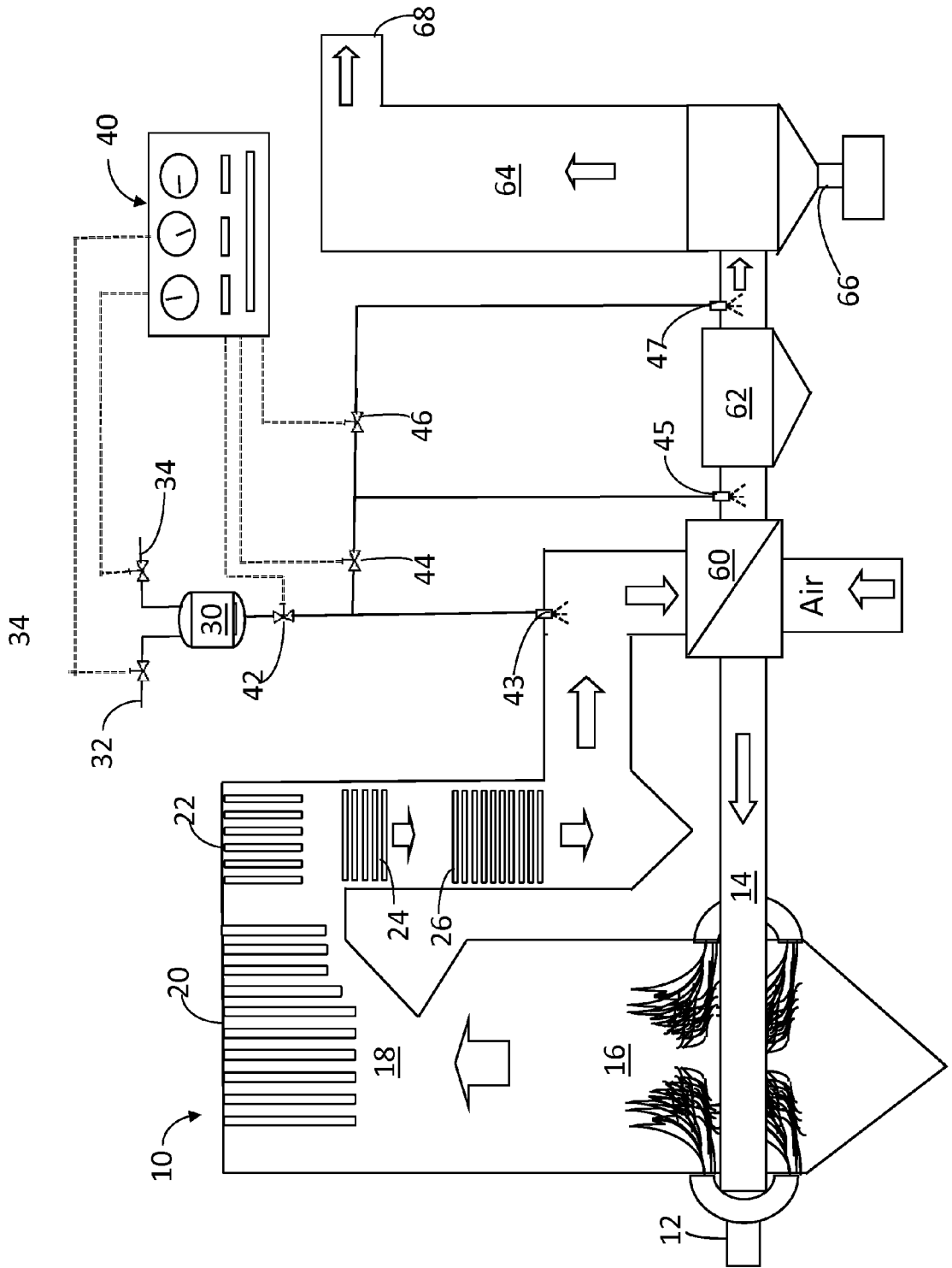

ASH COMPOSITIONS RECOVERED FROM COAL COMBUSTION GASES HAVING REDUCED EMISSIONS OF HCl AND/OR MERCURY

This application claims priority to U.S. patent application Ser. No. 13/854,361, filed Apr. 1, 2013, now U.S. Pat. No. 8,916,120 and Ser. No. 14/190,451, filed Feb. 26, 2014, and the disclosures of those applications are incorporated by reference herein in their entireties.

FIELD OF THE INVENTION

The invention relates to a highly useful form of coal ash produced by treating coal combustion gases to reduce emissions of hydrogen chloride (HCl) and/or mercury (Hg) employing a group of highly-effective chemicals and recovering the ash.

BACKGROUND OF THE INVENTION

Fly ash is one of the residues created during the combustion of coal in coal-fired power plants. Fine particles rise with flue gasses and are collected by suitable means with filter bags or electrostatic precipitators.

Because fly ash is a by-product material of coal combustion, which is highly variable in composition, the chemistry of fly ash from various sources can vary considerably, but all fly will contain silicon dioxide ($SiO_2$), calcium oxide (CaO), iron (III) oxide ($FeO_2$) and aluminum oxide ($Al_2O_3$). And, depending on its source, coal may include one or more toxic chemicals, such as arsenic, beryllium, boron, cadmium, chromium, cobalt, lead, manganese, mercury, molybdenum, selenium, strontium, thallium, and vanadium, in trace amounts. Mercury is a significant environmental problem and, though apparently trapped in the fly ash, can leach into the surrounding environment when ordinary use, storage or disposal measures are involved.

Coal ash can be disposed of as a wet residue in ash ponds or as a dry residue that can be sold or buried. Ash ponds are the most common form of disposal but add costs and are subject to strict regulation. Fly ash leachate can contain mercury and other heavy metals in excess of that permitted under current RCRA standards. Water flow through a fly ash pond into ground water can be controlled by using low-permeability clay layers and the like, but these add expenses and a better remedy would be desired.

Dry disposal can also be expensive. It is desirable, where possible, to dispose of the ash by selling it for use in concrete where it provides a valuable partial replacement for Portland cement. Having the property of reacting with calcium hydroxide, fly ash is useful in construction as is and can save costs associated with obtaining the naturally-occurring pozzolans traditionally used for making cement. The use of fly ash has been advocated as providing an economical way to conserve coal and partially recycle the byproducts of its combustion. It is credited with saving coal and reducing its pollution potential by reducing the amount of Portland cement that must be made, the production of which uses large amounts of coal in a type of combustion that makes it expensive to treat for pollutants. Unfortunately, the mercury and other heavy metals are too easily released to the surroundings.

Carbon content is an important factor in ash quality, and the ASTM (American Society for Testing and Materials) has set standard C618 for building codes with a limit of 6% carbon while industry preferences are seen as 3% and below. Carbon can interfere with air entrainment, which is important to controlling pouring properties. High carbon contents can also be a problem where combustion air is reduced to control $NO_x$ and where effluents are treated with activated carbon to remove mercury. Thus, efforts to control mercury by absorbing it on activated carbon has led to reduced air entraining capacity of the fly ash and limited its value for use in concrete.

The problems with emissions of hydrochloric acid and mercury have not been adequately addressed by many technologies used to reduce them and those technologies can adversely affect the quality of the ash. If not suitable for sale, the ash must be disposed of at significant expense. The environmental impact of contaminated ash has recently taken on technical and regulatory momentum.

It would be important to the environment if fly ash could be produced through the use of a group of non-sorbent chemicals which are effective for HCl and/or mercury reduction and could yield an ash product having good properties, including lowered solubility of mercury in the ash and low carbon contents. Such an improvement could have significant implications, especially because some procedures for reducing the harmful effects of HCl and/or mercury have been implicated in fly ash of reduced quality and/or ash disposal difficulties.

Accordingly, there is a present need for improved fly ash compositions and processes that can produce them while being effective at reducing HCl and/or mercury emissions from combustion gas streams by chemically converting removed chloride and mercury to chemically stable forms.

SUMMARY OF THE INVENTION

The present invention provides compositions and processes relating to high quality fly ash.

In one aspect, the invention provides a fly ash composition comprising: particulate coal ash, and water-insoluble copper (I) compositions, wherein the water-insoluble copper(I) compositions predominate in weight relative to the water-soluble copper compositions.

In another aspect, the invention provides a particulate coal ash product, comprising: coal ash, water-insoluble copper(I) compositions, and metallic mercury adsorbed onto ash particles, wherein the water-insoluble copper(I) compositions predominate in weight relative to the water-soluble copper compositions.

In another aspect, the coal ash composition of the invention will have a total mercury content of from 0.1 to 2.0 ppm and the water-soluble mercury is less than 20% of the total mercury content.

In one preferred aspect, the invention will produce a superior fly ash composition by combusting coal to produce hot combustion gases containing fly ash, $CO_2$, chlorine, and mercury, cooling the combustion gases and introducing into the combustion gases at a temperature of less than 1000° F., preferably within the range of from about 250° to about 900° F., a copper-based chloride remediator (CBCR), and collecting the fly ash which comprises insoluble copper(I) compositions and water insoluble mercury compounds.

Other preferred aspects, including preferred conditions and equipment and their advantages, are set out in the description which follows.

BRIEF DESCRIPTION OF THE DRAWINGS

The invention will be better understood and its advantages will become more apparent when the following detailed description is read in conjunction with the accompanying drawings, in which:

FIG. 1 is a flow diagram of one embodiment of a process for obtaining the quality fly ash compositions of the invention.

DETAILED DESCRIPTION OF THE INVENTION

The invention can be employed as a retrofit solution to existing combustors and can be used in design of new combustors. One embodiment of the process for obtaining the quality fly ash compositions of the invention is illustrated schematically in FIG. 1.

The fly ash compositions of the invention follow the definition of ASTM C 618-03, which defines two classes of fly ash: Class C and Class F. In addition, ASTM C 618-03 requires a loss on Ignition (LOI)<4%. In addition about 65% of the ash will have fineness of 45 μm or less. The primary difference between Class C and Class F fly ash is the amount of the amount of calcium, silica, alumina, and iron content in the ash. ASTM C 618-03 is incorporated herein by reference.

Class F is produced from burning harder, older anthracite and bituminous coal and contains less than 20% lime. It requires a cementing agent like Portland cement, quick lime or hydrated lime and is typically used in high sulfate exposure conditions. By virtue of its composition the addition of an air entrainer is needed, but it can be used for structural, HP (high performance) and high sulfate exposure concretes. It can be used at high fly ash contents.

Class C fly ash is produced from burning younger lignite and subbituminous coal and has a higher concentration of alkali and sulfate. It contains more than 20% lime and has self-cementing properties. It does not require an activator or an air entrainer, but it is not for use in high sulfate conditions. Its use is primarily for residential construction and is limited to low fly ash content concrete mixes. Samples can be tested for wet air entrainment according to ASTM Method C231 "Standard Test Method for Air Content of Freshly Mixed Concrete by the Pressure Method".

Class C fly ash is typically not as effective as Class F fly ash in mitigation of ASR (alkali-silica reaction), and Class C will generate more heat of hydration than Class F. In addition, Class C will generally not be as resistant to sulfate attack, and ASTM C618 prohibits the use of Class C in high sulfate exposure environments. In its favor, Class C will generate more strength at early ages than Class F, but Class F can generally be used for high fly ash content concretes (e.g., up to 40% of the cement matrix) whereas Class C is used in low fly ash content concretes.

The US Department of Transportation (US DOT) charts the properties of Class C fly ash along with Class F fly ash and Portland cement, as follows:

| Sample oxide analyses of ash and Portland cement | | | |
| --- | --- | --- | --- |
| Compounds | Fly Ash Class F | Fly Ash Class C | Portland Cement |
| $SiO_2$ | 55 | 40 | 23 |
| $Al_2O_3$ | 26 | 17 | 4 |
| $Fe_2O_3$ | 7 | 6 | 2 |
| CaO (Lime) | 9 | 24 | 64 |
| MgO | 2 | 5 | 2 |
| $SO_3$ | 1 | 3 | 2 |

The values of the fly ash of the invention can vary from these values, which are given as representative, but preferably not by more than 25%, and are typically within 10%. The US DOT further tabulates properties as follows, which are adopted here as representative for defining the fly ash of the invention. The values of the fly ash of the invention can vary from these values but preferably not by more than 25%, and are typically within 10%.

Specifications for Fly Ash in PCC

AASHTO M 295 (ASTM C 618)-Class F and C

| Chemical Requirements | | | |
| --- | --- | --- | --- |
| $SiO_2 + Al_2O_3 + Fe_2O_3$ | min % | 70[1] | 50 |
| $SiO_3$ | max % | 5 | 5 |
| Moisture Content | max % | 3 | 3 |
| Loss on ignition (LOI) | max % | 5[1] | 5[1] |
| Optional Chemical Requirements | | | |
| Available alkalis | max % | 1.5 | 1.5 |
| Physical Requirements | | | |
| Fineness (+325 Mesh) | max % | 34 | 34 |
| Pozzolanic activity/cement (7 days) | min % | 75 | 75 |
| Pozzolanic activity/cement (28 days) | min % | 75 | 75 |
| Water requirement | max % | 105 | 105 |
| Autoclave expansion | max % | 0.8 | 0.8 |
| Uniform requirements[2]: density | max % | 5 | 5 |
| Uniform requirements[2]: Fineness | max % | 5 | 5 |
| Optional Physical Requirements | | | |
| Multiple factor (LOI × fineness) | | 255 | — |
| Increase in drying shrinkage | max % | .03 | .03 |
| Uniformity requirements: | max % | 20 | 20 |
| Air entraining agent | | | |
| Cement/Alkali Reaction: | max % | 0.020 | — |
| Mortar expansion (14 days) | | | |

[1] ASTM requirements are 6 percent
[2] The density and fineness of individual samples shall not vary from the average established by the 10 preceding tests, or by all preceding tests if the number is less than 10, by more than the maximum percentages indicated.

The compositions of the invention will score well on the Foam Index test when used in Portland cement compositions utilizing these compositions at reasonable levels, e.g., up to 40%, preferably from 10 to 30%, of the cement composition apart from aggregate or other filler. The Foam Index Test is a rapid method to determine the relative levels of Air Entraining Agent (AEA) needed during concrete mixing, with or without mineral additives like combustion fly ash, that control air void volumes within cured concrete. AEA surfactants are added into concrete mixes to impart stable air microbubbles to give air void volumes between about 5% and 10%. Besides increasing workability, adding the correct amount of AEA during concrete mixing improves its resistance to cracking during freeze and thaw cycles. Adding too much AEA during mixing decreases concrete strengths. The Foam Index Test was developed to measure capacities of AEA for cement-mineral admixtures during concrete mixing and is a laboratory titration which determines the AEA absorption on fly ash and cement mixtures. An AEA is titrated into a fly ash and cement suspension and the suspension is shaken. The added AEA leads to foam formation on top of the liquid surface, which initially behaves in an unstable manner. At the end-point of the test, the AEA absorption sites are "saturated" and the AEA contributes to foam formation on the top of the mixture. The amount of AEA required to obtain stable foam depends on fly ash quality, fly ash-cement interactions, and characteristics of the AEA. Some fly ashes, typically those with high unburned carbon contents, tend to adsorb high amounts of AEA, i.e. more AEA is needed to obtain stable foam. A "Stable Foam" is achieved when no open areas of liquid show for at least 30-45 seconds on the surface of the foam. Bubbles break rapidly at AEA levels below the "Index"

level. Bubbles will still break for several increments above the "Index" level as well . . . don't continue adding AEA trying to stop the breaking bubbles. This point is difficult to judge at first. Run the same material several times in a row to help calibrate your "eye."

Reference will first be made to FIG. 1, which is a flow diagram of one embodiment of the process for obtaining the quality fly ash compositions of the invention. A combustor 10 can be of the type used for producing steam for electrical power generation, process steam, heating or incineration. It will be understood that other types of combustors can be employed to obtain the advantages of the invention. Unless otherwise indicated, all parts and percentages in this description are based on the weight of the materials at the particular point in processing or dry where that is indicated.

A suitable fuel, such as coal, is fed to the combustor 10 via line 12 and burned with air from line 14 in a combustion zone 16 to produce hot combustion gases. It is an advantage of the invention that coal that has significant chloride and mercury can be combusted with the resulting pollutant HCl and Hg emissions reduced. It will be understood that the principles of the invention can be applied to other carbonaceous fuels and fuel mixtures (any other fuel of choice, typically a carbonaceous thermal fuel or refuse).

Air for combustion, supplied by line 14, is preferably preheated by gas-to-gas heat exchanger 60 which transfers heat from ductwork at the exit end of the combustion equipment, e.g., downstream of heat exchange sections 20, 22, 24 and 26, where useful thermal energy is recovered from the hot combustion gases which are cooled. Hot combustion gases flow through the upper portion of combustor 18 as indicated by the block arrows, then flow past heat exchangers shown in various sections, from 20, 22, 24 and 26, which transfer heat from the combustion gases to water or steam for the generation of steam or super-heated steam. A typical heat exchanger configuration will include a plurality of heat exchanger sections, such as a superheater 20, a reheater 22 and an upper economizer 24 and a lower economizer 26. Other configurations may also be employed as dictated by the design of a particular boiler.

Based on several test programs, it has been discovered and substantiated that a group of highly-active copper compositions are effective for remediating HCl and/or mercury emissions and can be employed as water-borne chemicals for introduction into a flue gas to be treated. The group of copper compositions effective for HCl and/or $SO_x$ emissions control according to the invention are referred to herein as copper-based chloride remediators (CBCRs). As used in this description, the term "composition" includes compounds and complexes and is not meant to differentiate between types of bonding, e.g., "strong bonds" such as covalent or ionic bonds and "weak bonds" such as dipole-dipole interactions, the London dispersion force and hydrogen bonding. It is believed that some of the CBCRs are chemical complexes. Compositions described in U.S. Pat. Nos. 3,900,504 and 4,020,180 to Woerner are included as CBCR compositions, and the disclosures of these patents are specifically incorporated herein by reference in their entireties. Specifically referenced compositions are those described in U.S. Pat. No. 4,020,180 as comprising an aqueous cuprammonium lower carboxylate complex of copper lower carboxylate and ammonium lower carboxylate in weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

Significantly, these compositions are not sorbents that collect pollutants and survive passage though the combustor for collection downstream. The CBCRs identified by the invention do not survive but are chemically altered to a form that reacts with the target pollutants.

The CBCR compositions of interest according to the invention are highly soluble or dispersible in water and react with the hot combustion gases to result in compositions chemically different from when contacted with the combustion gases. The compositions of interest include copper compositions that have copper in a form that can be released at the temperatures involved to form a reactive copper entity. While it is theorized that the copper is oxidized to copper oxide, CuO, applicants do not want to be bound by a particular theoretical reaction. It is believed that the reactive form of copper released can react with the HCl in the combustion gases to form a solid, e.g., CuCl with minor amounts of $CuCl_2$, that can be collected with the ash by conventional particulate separation equipment such as an electrostatic precipitator (ESP) or a baghouse 62, alone or in suitable combination that may include one or more other particulate recovery devices. The ash recovered will be of suitable quality for use in Portland cement and will comprise coal ash, water-insoluble copper(I) composition, and metallic mercury adsorbed onto ash particles, wherein the water-insoluble copper(I) compositions predominate in weight relative to the water-soluble copper compositions. The coal ash composition of the invention can have a total mercury content of from 0.1 to 2.0 ppm and the water-soluble mercury is less than 20% of the total mercury content.

The amount of copper relative to the ash makes exact analysis difficult so tests have been run to simulate the formation of the copper compositions of the end product, which are substantially insoluble and believed to be predominantly insoluble copper(I) compositions, e.g, copper(I) chloride, clinoatacamite or atacamite, or combinations of these. No soluble copper chloride compounds were detected by XRD in the simulation.

One Wikipedia reference give the relative solubilities of copper chlorides in water, where units of solubility are given in grams per 100 grams of water (g/100 g).

| Substance | Formula | 20° C. |
| --- | --- | --- |
| Copper(I) chloride | CuCl | 0.0099 |
| Copper(II) chloride | $CuCl_2$ | 73 |

Thus, the CuCl is considered insoluble whereas the $CuCl_2$ is not.

Among the CBCRs of interest to the invention are compositions that comprise copper and an ammonia moiety. Among these are ammonium copper compositions, including those having one or more copper atoms with one or more ammonium moieties. Water solubility or dispersibility is important because introducing them with water has been shown to be a highly-effective manner of achieving the necessary distribution followed by dissociation. Chemical dispersants and agitation can be employed as necessary.

In some embodiments of the invention, the CBCR will comprise a copper composition selected from the group consisting of copper ammonium acetate, copper diammonium diacetate, copper ammonium triacetate, copper triammonium acetate, copper acetate monohydrate, copper acetylacetonate (and hydrates thereof), copper citrate (and hydrates thereof, e.g., hemipentahydrate), copper formate (and hydrates thereof), copper nitrate (and hydrates thereof), copper 2,4- pentandionate (and hydrates thereof), copper sulfate (and hydrates thereof), copper gluconate (and hydrates thereof), copper soaps of fatty acids, and mixtures of any of these. From another perspective, the CBCR can be a member selected from the group consisting of compositions defined by the formula $Cu(NH_3)_x(lower\ carboxylate)_y$, wherein the lower carboxylate is selected from the group consisting of formate, acetate and propionate, x is an integer from 0 to 4, y is an integer from 0 to 2, and x+y is equal to or greater than 1.

Closely related compositions and their hydrates as well other copper sources that exhibit similar efficacies in reacting with HCl can be employed. Copper compositions that contain no ammonium moiety, can be employed, but it is believed that these compositions will be facilitated in effectiveness by the presence of ammonia, such as a result of processing (e.g., for $NO_x$ reduction) or by supplementation as needed with ammonia or urea or other material effective to produce ammonia at the temperatures involved, as well as compounds equivalent in effect, e.g., ammines and their salts, urea breakdown products, ammonium salts of organic and inorganic acids, ammonium carbamate, biuret, ammelide, ammeline, ammonium cyanate, ammonium carbonate, ammonium bicarbonate; ammonium carbamate; triuret, cyanuric acid; isocyanic acid; urea formaldehyde; melamine; tricyanourea and mixtures and equivalents of any number of these.

Among the CBCRs not containing an ammonium moiety are copper acetylacetonate (and hydrates thereof), copper citrate (and hydrates thereof, e.g., hemipentahydrate), copper formate (and hydrates thereof), copper nitrate (and hydrates thereof), copper 2,4-pentandionate (and hydrates thereof), copper sulfate (and hydrates thereof), copper gluconate (and hydrates thereof), copper soaps of fatty acids, and mixtures of any of these.

Reference is again made to FIG. 1, which depicts a mixing stage 30 provided to prepare an aqueous treatment agent containing water supplied via line 32 and one or more CBCRs supplied via line 34. The vessel can be agitated as necessary. The relative amounts of the materials and water can be controlled by a suitable controller 40, or batching and feed of the CBCRs can be achieved manually. Dotted lines in the drawings schematically designate control lines for proper communication between the various controlled lines and valves and the controller 40.

The aqueous CBCR will typically be supplied in aqueous form, e.g., containing from 80 to 99.8% water, with a narrower range being from about 85 to about 95%. These and other percentages given in this application are based on weight.

Preferred conditions will call for introducing the CBCRs using modeling techniques, such as computational fluid dynamics, which can be employed to initially determine the optimum locations (zones) to direct treatment chemicals within the boiler and/or ducts. Desirably, best CBCR introduction will achieve essentially full coverage of the CBCRs across a three-dimensional section of a passage for the gases to be treated. Preferably, a number of nozzles will be spaced within the zones to achieve at least 90% coverage at the temperature necessary for reaction. This section can have a depth in the direction of flow as necessary to assure complete coverage from the sorbent injectors used. In other words, the zone will preferably be of a depth in the direction of flow sufficient that each of the conical or like spray patterns from nozzles used to introduce the CBCR will overlap with at least one other spray pattern, thereby providing CBCR across the entire cross section of the zone. This three-dimensional section for treatment can be referred to as a defined introduction zone, and the aqueous CDCR will be introduced into this zone under conditions effective for HCl and/or $SO_x$ emissions control. Following this zone (i.e., downstream of it) the combustion gases now having been treated with the CBCR are discharged following sufficient reaction time to reduce the HCl and/or $SO_x$ concentration in the gases.

Depending on whether it is HCl or $SO_2$ being treated, or both, monitors for the designated pollutant will be positioned before and after the introduction zone to determine the effectiveness of the treatment. Monitors following the zone are positioned far enough downstream of the zone to assure time for essentially complete reaction between the pollutant and the CBCR. Residence times of at least one second and preferably from 2 to 5 seconds will usually be effective.

Desirably, the invention will achieve full effect by modeling, e.g., by mechanical modeling or computational fluid dynamics using computer and data input means to identify locations within a combustor for feeding aqueous CBCR and determine the physical form and injection parameters such as pressure, droplet size, droplet momentum and spray pattern for injection means positioned at locations, e.g., via injector locations 43, 45 and 47, which can be operated with the aid of valves 42, 44 and 46 via controller 40.

Each of the injector locations will typically employ a plurality of nozzles strategically positioned across the cross section at the designated locations to achieve essentially full cross sectional coverage. Note that FIG. 1 shows addition of aqueous CBCR into a suitable portion of the ductwork, e.g., before or after air preheater 60, before or after ESP or baghouse 62, where the temperature will be suitable, e.g., less than about 1000° F., say within the range of from about 900° to about 250° F. where the objective is to reduce HCl, while temperatures as high as 2200° F., but more typically from about 900° to about 250° F. can be employed where the objective is to reduce sulfur oxides.

The treatment rates of the aqueous CBCR will provide an effective amount of aqueous CBCR to assure that the HCl content is maintained below about 0.002 pounds per MMBtu (approximately 2.0 $ppm_v$). Feed rates will generally be less than 10 pounds per ton of fuel, e.g., from about 1 to 8 pounds per ton, and often from greater than about 1 to about 6 pounds per ton of fuel.

The invention will employ suitable injection means, such as nozzles of the internal mix or external mix type, which can be (but don't have to be) air atomized and are capable of feeding a hydrated dolomite sorbent and a sorbent doping agent at a predetermined rate relative to a measured concentration of $SO_x$ in said passage. The injection means should be further capable of introducing the aqueous CBCR in a predetermined physical form and with predetermined injection parameters for the aqueous CBCR including droplet size, momentum and concentration. Preferably, air assisted-atomizing nozzles are provided for introducing aqueous CBCR into combustion gases at an effective temperature.

The locations for the nozzles can be determined by computational fluid dynamics, by methodologies taught for example in U.S. Pat. No. 5,740,745 and U.S. Pat. No. 5,894,806, which are hereby incorporated by reference. The concentration of the CBCR and water in the treatment fluid, the nozzle pressure, droplet size, droplet momentum, spray pattern and flow rates can be initially determined by modeling to assure that the proper amount of CBCR is supplied to the correct location in the combustor or downstream equipment in the correct physical form to achieve the desired results of reduced HCl and/or mercury.

The introduction of the aqueous CBCR into the combustion gases results in changes to the chemical makeup of the gases and the solids recovered. We believe that the HCl has been largely converted from the gas phase to the solid phase believed to be primarily water-insoluble copper(I) chloride or other insoluble copper compositions like clinoatacamite or atacamite, and a minor amount of water-soluble copper compositions, e.g., copper(II) chloride, which can simply be separated by particulate recovery equipment. It is preferred that more than half of the copper compositions be insoluble, with more preferred levels being above 60% or over 70%.

We also believe that particulate mercury is removed with the fly ash by the particulate control device so that it doesn't pose an emissions challenge. Oxidized mercury ($Hg^{2+}$) and elemental)($Hg^0$) are present in the gas phase, and must be captured and removed by the particulate collection device or wet flue gas desulfurization (wFGD) unit 64 following particulate recovery device 62. Oxidized mercury ($Hg^{2+}$) is ionic and polar, and adsorbs onto negatively charged (i.e. nucleophile) surfaces.

It is, of course possible and is sometimes preferred to introduce other chemicals at the same or different locations as described in U.S. Provisional Patent Applications 61/618,233 filed Mar. 30, 2012 and 61/641,055 filed May 1, 2012.

It is an advantage of the invention that after contact times of less than about 3 seconds, e.g., under a second, the added reaction time provided by a fabric filter is not essential as it is to lesser active sorbent treatments of the prior art. Solids from the wFGD unit 64 can be recovered via line 66, and flue gas can be exhausted via line 68.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. A particulate product suitable for use in making cement, comprising:
   a. coal ash, and
   b. water-insoluble copper compositions,
   wherein the water-insoluble copper compositions predominate in weight relative to water-soluble copper compositions.

2. A particulate coal ash product, comprising:
   a. coal ash,
   b. water-insoluble copper chloride, and
   c. water-soluble copper chloride,
   wherein the water-insoluble copper chloride predominates in weight relative to the water-soluble copper chloride.

3. A coal ash composition comprising:
   a. coal ash,
   b. water-insoluble copper chloride, and
   c. metallic mercury adsorbed onto ash particles,
   wherein the water-insoluble copper chloride predominates in weight relative to water-soluble copper chloride.

4. A coal ash composition according to any of claims 1 to 3 wherein the total mercury content of the composition is from 0.1 to 2.0 ppm and the water-soluble mercury is less than 20% of the total mercury content.

* * * * *